United States Patent
Bryant et al.

[19]

[11] Patent Number: 6,024,884
[45] Date of Patent: Feb. 15, 2000

[54] METHOD FOR CREATING MICROSTRUCTURES

[75] Inventors: Steven R. Bryant, Broomfield; Steven C. Herrera, Littleton, both of Colo.

[73] Assignee: Storage Technology Corporation, Louisville, Colo.

[21] Appl. No.: 09/042,682

[22] Filed: Mar. 12, 1998

[51] Int. Cl.[7] ............................... B44C 1/22; C23F 1/00
[52] U.S. Cl. ........................... 216/2; 216/22; 216/57; 216/66; 216/72; 216/100; 204/192.34; 29/603.18
[58] Field of Search .............................. 216/2, 22, 57, 216/66, 72, 100; 204/192.34; 29/603.18

[56] References Cited

U.S. PATENT DOCUMENTS

| | | | |
|---|---|---|---|
| 4,418,472 | 12/1983 | Lorenzo, Jr. ..................... | 29/603.18 |
| 5,141,623 | 8/1992 | Cohen et al. . | |
| 5,296,407 | 3/1994 | Eguchi . | |
| 5,349,745 | 9/1994 | Kawabe et al. . | |
| 5,438,747 | 8/1995 | Krounbi et al. . | |
| 5,587,090 | 12/1996 | Belcher et al. . | |
| 5,649,351 | 7/1997 | Cole et al. . | |
| 5,658,425 | 8/1997 | Halman et al. . | |
| 5,673,163 | 9/1997 | Cohen ................................. | 360/126 |
| 5,700,380 | 12/1997 | Krounbi et al. . | |
| 5,867,890 | 2/1999 | Hsiao et al. ...................... | 29/603.14 |
| 5,874,010 | 2/1999 | Tao et al. ............................. | 216/22 |

*Primary Examiner*—Margaret Einsmann
*Attorney, Agent, or Firm*—Brooks & Kushman P.C.

[57] ABSTRACT

Microstructures are ion milled in an existing layer by a process including forming a metal mask then milling in the presence of a reactive gas which combines with the metal to form a surface that mills at a lower rate than the metal alone. The metal mask is formed through wet etching, with a wet etch stop film preventing the existing layer from being attacked by the wet etchant. In a preferred embodiment, cobalt-zirconium-tantalum (CZT) is milled to form top poles for tape write heads. A gold (Au) wet etch stop film is first applied to the CZT layer. Next, a titanium (Ti) layer is deposited. A photoresist mask is formed and the Ti is wet etched, producing a metal mask. Milling with nitrogen ($N_2$) in the presence of argon (Ar) ions causes the exposed layer of Ti to form titanium nitride (TiN), which mills at a slower rate than Ti.

7 Claims, 2 Drawing Sheets

METHOD FOR CREATING MICROSTRUCTURES

TECHNICAL FIELD

The present invention relates to masking and etching microstructures.

BACKGROUND ART

Increasing efforts to miniaturize have resulted in the need to construct microstructures in thin films. One example is in the area of constructing write heads for magnetic storage media.

Write heads are used in disk and tape storage systems to generate a magnetic signal corresponding to information to be stored on the disk or tape. Top poles form a portion of an inductive element that converts an electrical pulse into a magnetic pulse. The magnetic pulse writes a transition in magnetic media on the disk or tape. Top poles are constructed from magnetic materials such as, for example, cobalt-zirconium-tantalum (CZT).

In order to increase the data density of disk and tape storage systems, write tracks are narrowed. This requires a corresponding decrease in the write track line widths defining top poles. As the width decreases, the tolerance on dimensions also decreases. Producing smaller structures with tighter dimensions in CZT has driven the need to develop thin film manufacturing processes with increased precision.

One method for etching thin film material, such as CZT top poles, is to use a wet etch process. In wet etching, a mask layer is deposited over regions that are not to be etched. The assembly is then exposed to a wet etchant. The etchant dissolves material not protected by the mask. A difficulty with wet etching is that the etchant dissolves some material underneath the mask. Hence, wet etching cannot achieve the tolerances required for smaller write tracks.

Another method for etching thin film structures such as CZT poles is ion milling. In ion milling, argon (Ar) is used to remove material in unmasked areas. Ion milling has the advantage that, if conditions are appropriate, a near vertical etch can be obtained. One difficulty with Ar ion etching is that the mask is also etched away. Since there is a limit to how thick a typical photoresist mask can be applied using common manufacturing methods, the photoresist mask limits the thickness of the resulting structure.

What is needed is a method for masking and etching microstructures, in particular CZT top poles, that allows ion milling to be used for achieving desired tolerances with the desired microstructure thickness.

SUMMARY OF THE INVENTION

It is an object of the present invention to produce microstructures in an existing film.

Another object of the present invention is to increase the thickness of a layer etched in an ion milling operation by using a metal mask and a reactive gas which combines with exposed regions of the metal mask to produce a material with a slower milling rate.

Still another object of the present invention is to produce microstructures with a desired thickness and tolerance in CZT.

Yet another object of the present invention to produce top poles with reduced tolerances.

A further object of the present invention is to produce top poles with desired thicknesses.

In carrying out the above objects and other objects and features of the present invention, a method is provided for etching a microstructure in an existing layer including depositing a wet etch stop film on the existing layer, depositing a metal layer on the wet etch stop film, forming a photoresist mask on the metal layer, wet etching the metal layer exposed by the photoresist mask to form a metal mask, and ion milling the existing layer exposed by the metal mask in the presence of a reactive gas, the reactive gas combining with an exposed surface of the metal mask to form a surface material with a slower mill rate than the remaining metal mask.

In one embodiment, the reactive gas is nitrogen.

In another embodiment, the metal layer comprises titanium.

In still another embodiment, the wet etch stop film comprises gold.

In a further embodiment, the wet etch stop film further comprises a layer of titanium between the existing layer and the gold, to promote adhesion of the gold to the existing layer.

In a preferred embodiment, a method is described for etching a structure in a layer of cobalt-zirconium-tantalum including depositing a wet etch stop film on the CZT layer, depositing a titanium layer on the wet etch stop film, forming a photoresist mask on the titanium layer, wet etching the titanium layer exposed by the photoresist mask to form a titanium mask, and milling the CZT layer exposed by the Ti mask with ionized argon (Ar) while the Ti mask is in the presence of nitrogen ($N_2$).

The above objects and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
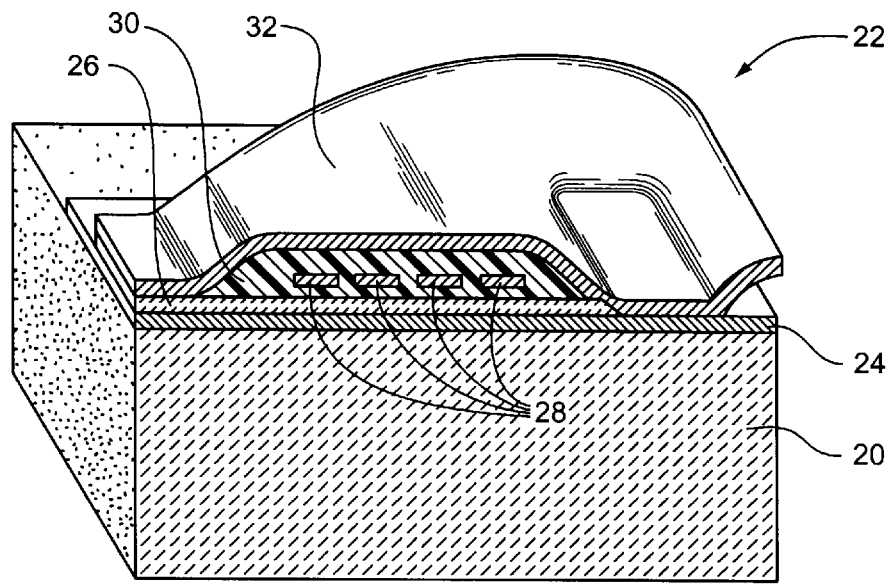
FIG. 1 is a diagram showing a CZT write head.

Referring now to FIG. 1, a diagram showing a write head is shown. Substrate 20 forms the base for a write head, shown generally by 22. Bottom pole 24 is deposited on substrate 20. Gap layer 26 followed by conductors 28 in insulator material 30 are formed on bottom pole 24. Top pole 32 is placed over gap layer 26 and insulator material 30 to form write head 22.

Bottom pole 24 and top pole 32 form an electromagnet. When current is passed on conductors 28, a magnetic field is produced. This magnetic field can write transitions on magnetic media, such as a magnetic tape or disk, for information storage.

Referring now to FIGS. 2 through 11, conceptualized cross-sectional diagrams of fabrication steps are shown. The drawings are not to scale, and are provided for the purpose of indicating placement of layers and manufacturing operations.

Figure 2:
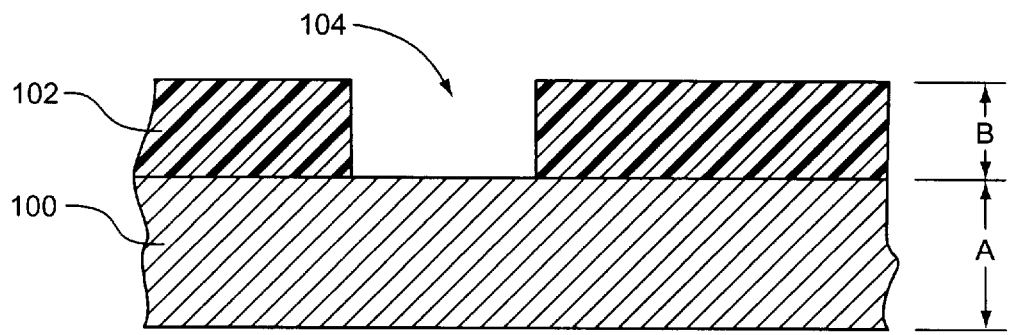
FIG. 2 is a conceptualized cross-sectional diagram of a CZT layer prior to etching by a previous method.

Referring now to FIG. 2, a conceptualized cross-sectional diagram of a CZT layer prior to etching according to a previous method is shown. CZT layer 100 is to be etched to form top pole 32. Photoresist layer 102 is placed on CZT layer 100. Photoresist layer 102 is exposed to a spatially modulated radiation source to form a mask as is well known in the art. An opening in photoresist layer 102, shown generally by 104, defines an area below which CZT layer 100 is to be etched away. Photoresist layer 102 may then be removed, leaving the desired structure in CZT layer 100. Traditionally, the etching of CZT layer 100 has been accomplished with a wet chemical etchant. However, because the wet chemical etchant attacks CZT layer 100 underneath photoresist layer 102 as well as under opening 104, precise tolerances cannot be obtained. In order to meet density expectations for CZT write heads, tolerances for top pole line widths will be less than ±1 micron. This tolerance is not achievable in CZT with wet etching.

An alternative to wet chemical etching is ion milling, also known as ion beam etching, a form of dry etching. In ion milling, ionized argon (Ar) atoms are accelerated into the material to be etched. When the ionized atoms strike, small particles of the material are blasted free. Ion milling is highly anisotropic, etching substantially in the direction in which the atoms are accelerated. This directionality makes ion milling attractive for forming top pole 32 in CZT. However, because the etching is physical in nature as opposed to a being chemical reaction, masking material tends to be etched as well as the desired CZT. In an exemplary ion milling operation, CZT is etched at a rate of 326 angstroms per minute and photoresist at a rate of 350 angstroms per minute.

Referring again to FIG. 2, the thickness of CZT layer 100, shown as dimension A, is 5.5 microns. Therefore, using the exemplary ion milling operation, the thickness of photoresist layer 102, shown as dimension B, must be at least 5.9 microns. However, techniques for applying photoresist allow a thickness of at most 2.5 microns, prohibiting the use of ion milling using previous masking and etching methods.

Figure 3:
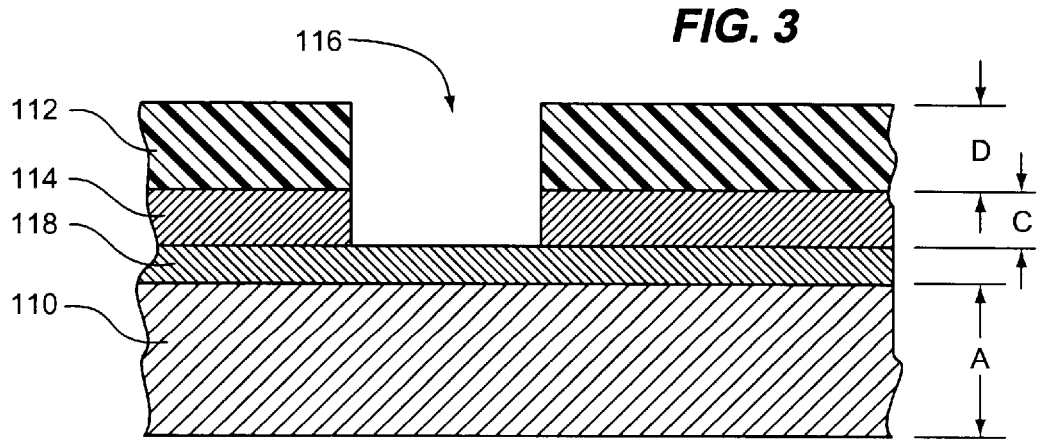
FIG. 3 is a conceptualized cross-sectional diagram of a layer prior to ion milling by the method of the present invention.

Referring now to FIG. 3, a conceptualized cross-sectional diagram prior to ion milling according to the method of the present invention is shown. A structure in CZT layer 110 is defined by a two-layer mask consisting of photoresist mask 112 above titanium (Ti) mask 114. An opening in photoresist mask 112 and Ti mask 114, shown generally by 116, defines an area below which CZT layer 110 is to be etched away. Wet etch stop film 118 prohibits the wet etching process, used to form opening 116 in Ti mask 114, from attacking CZT layer 110. During ion milling, CZT layer 110 is etched away in the area under opening 116. Photoresist mask 112 and Ti mask 114 are also attacked during ion milling. To reduce the thickness of Ti mask 114, the reactive gas nitrogen ($N_2$) is mixed with the Ar during ion milling. When the Ti is exposed, $N_2$ combines with Ti on the surface of Ti mask 114 to form titanium nitride (TiN). Titanium nitride has a slower ion milling etch rate and, hence, Ti mask 114 can be thinner.

In a preferred embodiment, the thickness of photoresist mask 112 and Ti mask 114 are such that, when the thickness of CZT layer 110 under opening 116 is etched away, a thin film of Ti mask 114 remains. In one embodiment, the thickness of CZT layer, shown as dimension A in FIG. 3, is 5.5 microns. In an illustrative ion milling operation, CZT is removed at a rate of 326 angstroms per minute, requiring 168 minutes to etch away portions of CZT layer 110 required to form the desired structures. The thickness of Ti mask 114, shown as dimension C, is 1.6 microns. In the illustrative ion milling operation, Ti exposed to $N_2$ is removed at a rate of 142 angstroms per minute, requiring 105 minutes to remove Ti mask 114. The thickness of photoresist mask 112, shown as dimension D, is 2.5 microns. In the illustrative ion milling operation, photoresist is removed at a rate of 350 angstroms per minute, requiring 71 minutes to remove photoresist mask 112. The combined time to remove photoresist mask 112 then Ti mask 114 is 176 minutes. Since only 168 minutes are required to remove the CZT, a portion of the Ti mask approximately 2000 angstroms thick will remain. Note that the time required to mill through wet etch stop film 118 has not been considered due to the relative thinness of wet etch stop film 118. Wet etch stop film 118 is described with regards to FIG. 5 below.

Referring now to FIGS. 4 through 11, the method of the present invention is shown as a sequence of conceptualized cross-sectional diagrams.

Figure 4:
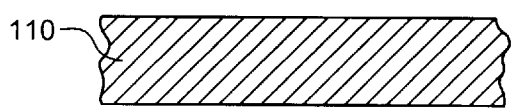
FIGS. 4 through 11 show a CZT structure at various stages of manufacture according to the method of the present invention.

Referring now to FIG. 4, existing layer CZT layer 110 is shown. CZT layer 110 may be built on a substrate such as Aluminum-Titanium Oxide. The substrate is not shown for clarity. The existing layer material should not combine with the reactive gas in such a manner that the etch rate of the existing material is decreased. The reactive gas is further described with regards to FIG. 10 below.

Figure 5:
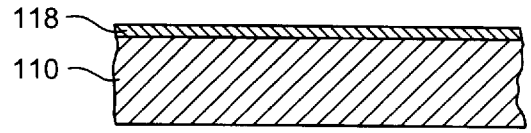

Referring now to FIG. 5, wet etch stop film 118 is shown deposited on CZT layer 110. The purpose of wet etch stop film 118 is to protect CZT layer 110 from the wet etchant used to form Ti mask 114.

In a preferred embodiment, wet etch stop film 118 is comprised of gold (Au). The inventor has found that a thickness of 1000 angstroms provides sufficient protection for CZT layer 110 during wet etching of Ti mask 114. However, any thickness that sufficiently protects the layer beneath the wet etch stop film can be used.

In a further preferred embodiment, wet etch stop film 118 is further comprised of a Ti adhesion film between the structural layer, CZT layer 110, and the Au film. The Ti film allows better adhesion than CZT to Au. The inventor has found that a Ti film thickness of 200 angstroms provides sufficient adhesion of Au to CZT. The inventor has further found that Ti and Au may be put down by evaporation in the same system. The adhesion layer material and thickness depends on the types of materials used to form the structural layer and the etch stop as well as the type of etchant. Any material that sufficiently bonds the etch stop material to the structural layer is appropriate. Note that, for some types of wet etch stop films and structural layers, an adhesion film may not be necessary.

Figure 6:
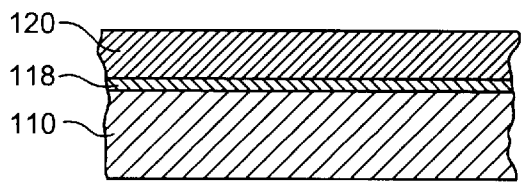

Referring now to FIG. 6, Ti layer 120 is deposited on wet etch stop film 118. Control of the thickness of Ti layer 120 is important, since the resulting Ti mask 114 thickness determines, in part, the maximum ion milling time for defining a structure in CZT layer 110 as described with regards to FIG. 3 above. The inventor has found that either a sputtering process or an evaporation process produces equally satisfactory results. Metals and alloys other than Ti, such as, for example, tantalum, tungsten or titanium-tungsten, may be used to form layer 120. Any material that combines with the reactive gas to form a substance with a relatively slow milling rate may be used.

Figure 7:
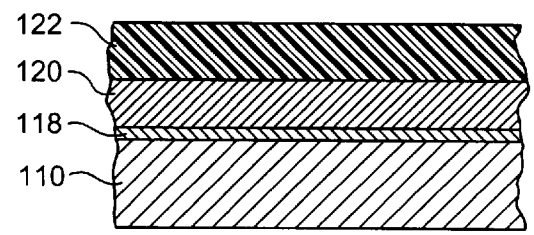

Referring now to FIG. 7, photoresist layer 122 is formed. Photoresist layer 122 may be formed by a spinning process to achieve the desired thickness and thickness tolerance.

Figure 8:
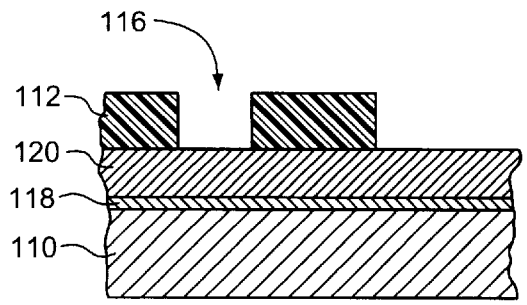

Referring now to FIG. 8, photoresist mask 112 is formed from photoresist layer 122 using a photo-lithographic process. Upon formation of photoresist mask 112, openings 116 define areas of Ti layer 120 to be removed by wet etching.

Figure 9:
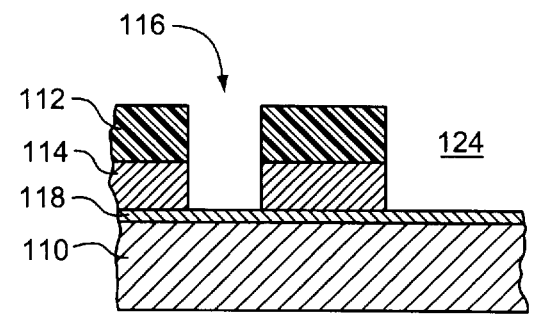

Referring now to FIG. 9, Ti layer 120 is wet etched to produce Ti mask 114. A wet etchant, shown generally by 124, dissolves Ti layer 120 to produce a metal mask layer. Wet etch stop film 118 resists wet etchant 124, preventing damage to CZT layer 110. The inventor has found that wet etchant 124 may be hydrofluoric acid (HF) in 2% concentration by volume.

Figure 10:
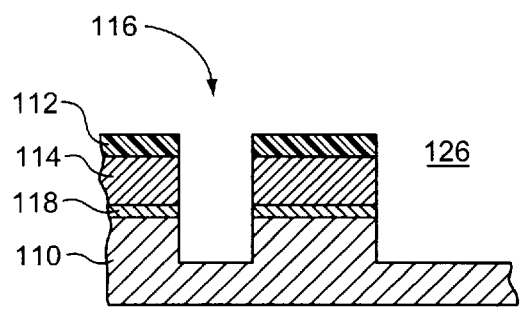

Referring now to FIG. 10, CZT layer 110 during ion milling is shown. The region in CZT layer 110 under opening 116 has been partially milled away. A portion of photoresist mask 112 has also been milled away.

Reactive gas mixture 126 contains Ar and $N_2$. The Ar is ionized in the milling process. Ar ions are energized to produce a current density of 0.62 milliamperes per square centimeter and targeted onto CZT layer 110 to remove particles of CZT through momentum transfer. $N_2$ reacts with Ti to form TiN at an exposed surface of Ti mask 114. The TiN is milled at a slower rate than Ti, resulting in a lower required thickness for Ti mask 114. The inventor has discovered that an $N_2$ pressure of 30% results in a full reaction of $N_2$ and Ti. The $N_2$ is blown over the surface of Ti mask 114 to facilitate the formation of TiN. Reactive gasses other than nitrogen such as, for example, oxygen, may be used. The combination of metal used in the metal mask layer and reactive gas must be compatible with remaining operations and must result in a material with a lower mill rate than the metal alone.

Figure 11:
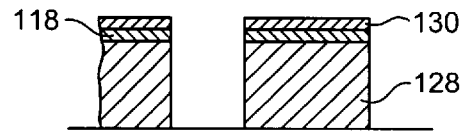

Referring to FIG. 11, CZT structure 128 milled from CZT layer 110 is shown. In a preferred embodiment, the thickness of photoresist mask 112 together with the thickness of Ti mask 114 is sufficient to allow a portion of Ti mask 130 to remain after forming CZT structure 128.

While the best mode described in detail creating top pole write head structures in CZT, the method of the present invention may be applied to many types of structures in a variety of materials. Those familiar with the art to which this invention relates will recognize various alternative designs and embodiments for practicing the invention as defined by the following claims.

What is claimed is:

1. A method for etching a structure in a layer of cobalt-zirconium-tantalum (CZT), the structure forming a top pole for a write head, the method comprising:

depositing a wet etch stop film comprising gold (Au) on the CZT layer;

depositing a titanium (Ti) layer on the wet etch stop film;

forming a photoresist mask on the Ti layer;

wet etching the Ti layer exposed by the photoresist mask to form a Ti mask; and milling the CZT layer exposed by the Ti mask with ionized argon (Ar) while the Ti mask is in the presence of nitrogen ($N_2$), thereby forming the structure in the CZT layer.

2. The method for etching a structure in a layer of CZT as in claim 1, the $N_2$ having a concentration of 30% by pressure.

3. The method for etching a structure in a layer of CZT as in claim 2, the Au wet etch stop film having a thickness of 1000 angstroms.

4. The method for etching a structure in a layer of CZT as in claim 2 further comprising depositing a Ti adhesion film on the CZT to promote adhesion of the Au wet etch stop film to the CZT.

5. The method for etching a structure in layer of CZT as in claim 4, the Ti adhesion film having a thickness of 200 angstroms.

6. The method for etching a structure in a layer of CZT as in claim 1, the thickness of the photoresist mask together with the thickness of the Ti mask sufficient to allow a portion of the Ti mask to remain after forming the structure in the CZT layer.

7. The method for etching a structure in a layer of CZT as in claim 6, the CZT layer having a thickness of 5.5 microns, the photoresist mask having a thickness of 2.5 microns, and the Ti mask having a thickness of 1.6 microns.

* * * * *